Oct. 3, 1961 ISOKAZU TANAKA ET AL 3,003,148
DIRECTION INDICATING DEVICE
Filed Aug. 5, 1958 2 Sheets-Sheet 1

Inventors
I. Tanaka
T. Kawamoto
S. Izawa
By Glascock Downing Seebold
Attys.

(a)          (b)

Inventors
I. Tanaka
T. Kawamoto
S. Izawa

United States Patent Office 3,003,148
Patented Oct. 3, 1961

3,003,148
DIRECTION INDICATING DEVICE
Isokazu Tanaka, Toshiro Kawamoto, and Shigeru Izawa, Tokyo-to, Japan, assignors to Kabushiki-Kaisha Koden Seisakusho, Tokyo-to, Japan
Filed Aug. 5, 1958, Ser. No. 753,334
Claims priority, application Japan Oct. 14, 1957
1 Claim. (Cl. 343—113)

This invention relates to a device for directly and omni-directionally indicating the direction of arrival of an electric wave or sound wave by using a directional antenna or microphone.

In one prior device of this type, the output of a directional receiver is impressed upon deflecting device of a cathode ray tube after having been amplified and detected to describe an image on the fluorescent screen of said tube, whereby representation of the direction of arrival of the received wave or the directivity of the receiver is made possible. In another prior device, the output of a directional receiver is amplified and detected, and then is used to drive an electric motor which is connected with the rotating shaft of said receiver, said device being arranged in such a manner that the torque of the motor will become zero when the direction of the receiver coincides with that of the incoming wave. However, said prior devices are very complicated in their construction.

Accordingly, it is the principal object of this invention to provide a direction indicating device which is simple in construction and can accurately indicate the direction of arrived wave or the directivity of the electric wave receiver on an all direction scale board by means of a light beam or a clearly visible spot having similar effect.

According to this invention, the electric power obtained by detecting and amplifying the output of a directional receiver is used to drive a light beam director which is rotated in unison with the receiver. From the standpoint of construction, said light beam director may be classified into three types, i.e. the moving armature type, moving coil type and piezo-electric type. Although the moving armature type and moving oil type directors are sturdy in construction and accurate in operation, the use of an electromagnet or a permanent magnet for driving the armature or coil may result in a large error in the case of the device in which, for instance, a magnetic compass is installed at the center of or near the direction indicating board. Therefore, in such cases, it is desirable to use a director of piezo-electric type which is not affected by any magnetic effect. The piezo-electric type director is advantageous because of its small driving power and its simple and compact construction although there is a slight inconvenience in magnification of the motion of its pointer.

Further objects and features of novelty of the present invention will become apparent from the following description, reference being made to the accompanying drawings, in which the same members are indicated by the same references, and in which.

Figure 1:
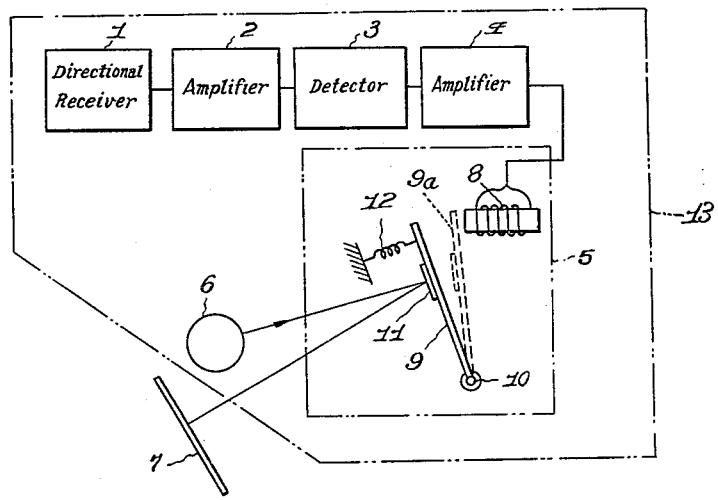
FIG. 1 is a block connection diagram illustrating one embodiment of this invention, wherein a moving armature type director is used.

Referring now to FIG. 1 which shows a block connection diagram of one embodiment of the present invention in which a moving armature type director is used, the device comprises a directional receiver 1 for electric wave or sound wave, an amplifier 2, a detector 3, an amplifier 4 for the detector output and a light beam director 5 driven by the output of said amplifier 4, said light beam detector comprising an electromagnetic coil 8, a moving armature 9 carrying with a reflecting mirror 11 and a biasing spring 12, said mirror 11 being used for reflecting the light beam coming from a light source 6 so as to project a light spot on a direction scale board 7. This direction scale board 7 may be of circular shape having a graduation of 0 to 360 degrees as, for instance, shown in FIG. 4a or it may be a translucent board which can be observed from the back side. The directional receiver 1, amplifier 2, detector 3, amplifier 4 and light beam director 5 are contained in a common rotatable casing 13. The casing 13 or only the light beam director 5 is so constructed as can be rotated manually or by means of an electric motor around the axis of the direction scale board 7 together with the directional receiver 1, said driving motor being not shown for the simplification of the drawing.

When any arriving wave presents, the output of the directional receiver 1 will change with the rotation of the casing 13 and the output obtainable by detecting and amplifying said receiver output will also change accordingly. Thus, the attractive or repulsive force exerted upon the moving armature 9 by the electromagnetic coil 8 will be changed so as to change the angle of the light beam reflected by the reflecting mirror 11. Supposing that the moving armature 9 is turned around a pivot 10 to the attracted position 9a indicated by broken line when the output of the receiver increases, movement of the projected light spot toward the outer periphery of the scale board 7 indicates increase of the output of the receiver. On the contrary, if the device is arranged in such a manner that the moving armature 9 is detached away from the coil 8 by the action of the biassing spring 12 upon increase of the output of the receiver (this may be done by reversing the polarity of the detector 3 or by giving an appropriate initial magnetic bias to the moving armature 9), movement of the projected light spot toward the center of the scale board 7 indicates increase of the output of the receiver 1. The configuration of the image appearing on the direction scale board 7 depends not only upon the characteristic of the directional receiver 1, but also upon the electrical characteristics of the detector 3, amplifier 4, etc., and further upon the operating characteristic of the light beam director 5. By the proper construction of various parts, it is possible to make the image on the scale board 7 maximum or minimum when the output of the receiver 1 becomes maximum. Thus, by rotating the casing 13, an image will be described by the light beam on the scale board 7, whereby the directional characteristic of the receiver and the direction of arriving wave can be directly observed by the aid of a scale graduated on the scale board.

Figure 2:
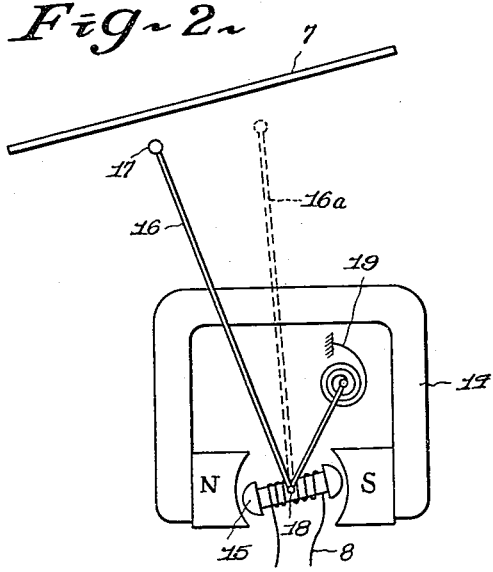
FIG. 2 shows one example of the construction of a moving coil type director which is applicable for this invention.

Referring now to FIG. 2, the moving coil type light beam director comprises a yoke 14 provided with a permanent magnet having N and S poles, a rotor 15 arranged in the air gap so as to be able to rotate around a pivot 18, a pointer 16 mounted on the rotor 15 and provided at its free end with a luminescent material, a small electric lamp or other clearly visible point 17, and a biassing spring 19. When a detected and amplified output current of a receiver such as shown by 1 in FIG. 1 is passed through a coil 8 for driving the rotor 15, the pointer 16 will be displaced to a broken line position 16a depending upon magnitude of the output. Therefore, by simultaneously rotating the directional receiver and this light beam director so as to describe a locus of said clearly visible point 17 on the scale board 7, the direction of the arriving wave can be directly observed in the same manner as in the case of FIG. 1. It will be obvious that the more accurate measurement can be made by forming the scale board 7 as a spherical surface having its center at the pivot 18.

Figure 3:
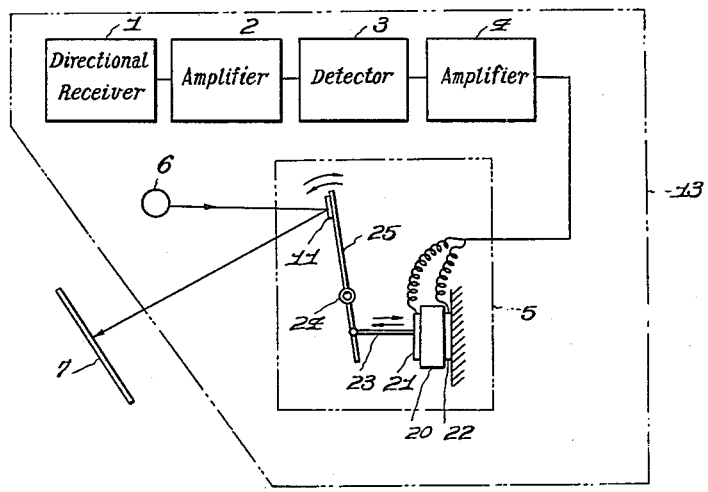
FIG. 3 shows a block connection diagram illustrating another embodiment of this invention, wherein a piezo-electric type director is used.

FIG. 3 shows a block diagram of a further modification of this invention which utilizes a piezo-electric element type light beam director, the arrangement of parts thereof being the same as that shown in FIG. 1 except the light beam director. The director 5 comprises a piezo-electric element 20 such as the Rochelle salt and the like, a moving electrode 21 attached to the element 20, a fixed electrode 22 attached to the element 20 and fixed to the casing, a connecting rod 23 fixed to the electrode 21, a movable lever 25 which is rotatably pivoted at 24 and which supports a reflecting mirror 11 at one end and is connected with the connecting rod 23 at the opposite end.

When the arriving wave presents, the output of the directional receiver will be changed with the rotation of the casing 13 and the output obtainable by detecting and amplifying the receiver output will also be changed accordingly. Thus, the voltage supplied to the electrodes 21 and 22 of the piezo-electric element will be changed, whereby the thickness of the element 20 is made to change. Since the electrode 22 is fixed to the casing, the electrode 21 will be displaced, and this displacement is transmitted to the movable lever 25 through the connecting rod 23, whereby the mirror 11 attached to said lever 25 will vary the angle of the reflected light beam. Thus, in the same manner as described in connection with FIG. 1, it will be evident that an image indicating the directional characteristic of the wave receiver and the direction of the arriving wave can be described on the direction scale board 7. It will be of course understood by those skilled in the art that, in the embodiment of FIG. 3, instead of using a mirror 11 and a light source 6, a luminescent substance, small electric lamp or other clearly visible point similar to the member 17 in FIG. 2 may be provided at the free end of the movable lever 25.

Figure 4:
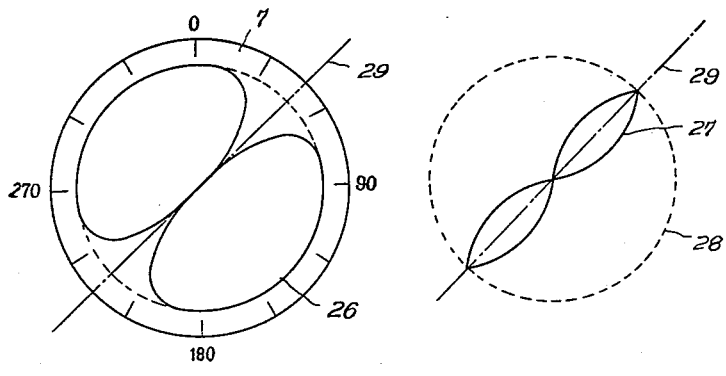
FIG. 4 shows the examples of images on the direction scale board.

FIG. 4 shows one example of a light image of a direction finder for the long and medium waves in the case of using a loop antenna in the wave receiver. FIG. 4a illustrates the image which is obtained when the direction finder is so constructed that the reflected light beam may be displaced toward the outer periphery of the scale board 7 according to increase of the output of the loop antenna, while FIG. 4b illustrates the image which is obtained when the finder is so constructed that the reflected light beam may be displaced toward the center of the scale board according to increase of the output of the loop antenna increases. In FIG. 4, the curves 26 and 27 show the images by light beam and the dot and dash lines 29 show the direction in which the output of the loop antenna is minimum or the direction of the coming electric wave. If there is no coming wave, in the case of FIG. 4a, the light spot will approach to the center, while in the case of FIG. 4b, the locus of the light spot will become a circle of a certain radius as shown by the broken line 28.

While the present invention has been shown and described in connection with preferred embodiments, it will be understood, of course, that this invention is not limited thereto alone and that this invention includes various other similar devices falling within the true spirit and scope of the appended claim.

What we claim as new and desire to secure by Letters Patent of the United States is:

A radio direction-indicating device comprising a directional radio receiver rotatable about a first axis and having means for providing an output voltage dependent on the strength of the incident radio energy, a light source and a reflector therefor mounted to rotate with said receiver about a second axis, means mounting the reflector for tilting movement about a third axis, a stationary screen mounted in fixed position relative to the light source and reflector for intercepting a reflected light beam, and linearly movable means rotatable with the mirror and responsive to the output voltage for tilting the mirror about the third axis an amount proportional to the output voltage, the linearly moving means comprising a piezo-electric device energized by the output voltage and mechanically linked to the mirror for tilting it an amount proportional to the output voltage.

References Cited in the file of this patent

UNITED STATES PATENTS 1,471,406   McCullough _____ Oct. 23, 1923

FOREIGN PATENTS 508,139   Great Britain _____ June 27, 1939